United States Patent [19]

Gibbon

[11] Patent Number: 4,952,360
[45] Date of Patent: Aug. 28, 1990

[54] METHOD OF MAKING MICROWAVE-HEATABLE HAIR CURLERS

[75] Inventor: Robert M. Gibbon, Fort Worth, Tex.

[73] Assignee: JMK International, Inc., Fort Worth, Tex.

[21] Appl. No.: 197,156

[22] Filed: May 23, 1988

[51] Int. Cl.$^5$ ............... B29C 47/00; B29C 47/06; B29C 65/56; B32B 1/08

[52] U.S. Cl. ............... 264/148; 29/450; 29/525; 264/150; 264/177.2; 264/211

[58] Field of Search ............... 264/148, 150, 159, 173, 264/176.1, 177.1, 177.2, 209.1, 211; 29/450, 525

[56] References Cited

U.S. PATENT DOCUMENTS 4,335,168 6/1982 Ergaver ............... 264/177.1 X
4,551,293 11/1985 Diehl, Jr. et al. ............... 264/150
4,737,324 4/1988 Gibbon ............... 264/150 X

FOREIGN PATENT DOCUMENTS 2395481 1/1979 France ............... 264/177.1
2431644 2/1980 France ............... 264/177.1

Primary Examiner—Jeffery Thurlow
Assistant Examiner—Leo B. Tentoni
Attorney, Agent, or Firm—Charles D. Gunter, Jr.

[57] ABSTRACT

A method of making a microwaveable hair curler is shown in which a silicone rubber composition is extruded through a die and then cut to a desired length. The silicone rubber composition is blended from a polyorganosiloxane gum, a particulate electromagnetic absorptive material, a filler and a catalyst.

7 Claims, 3 Drawing Sheets

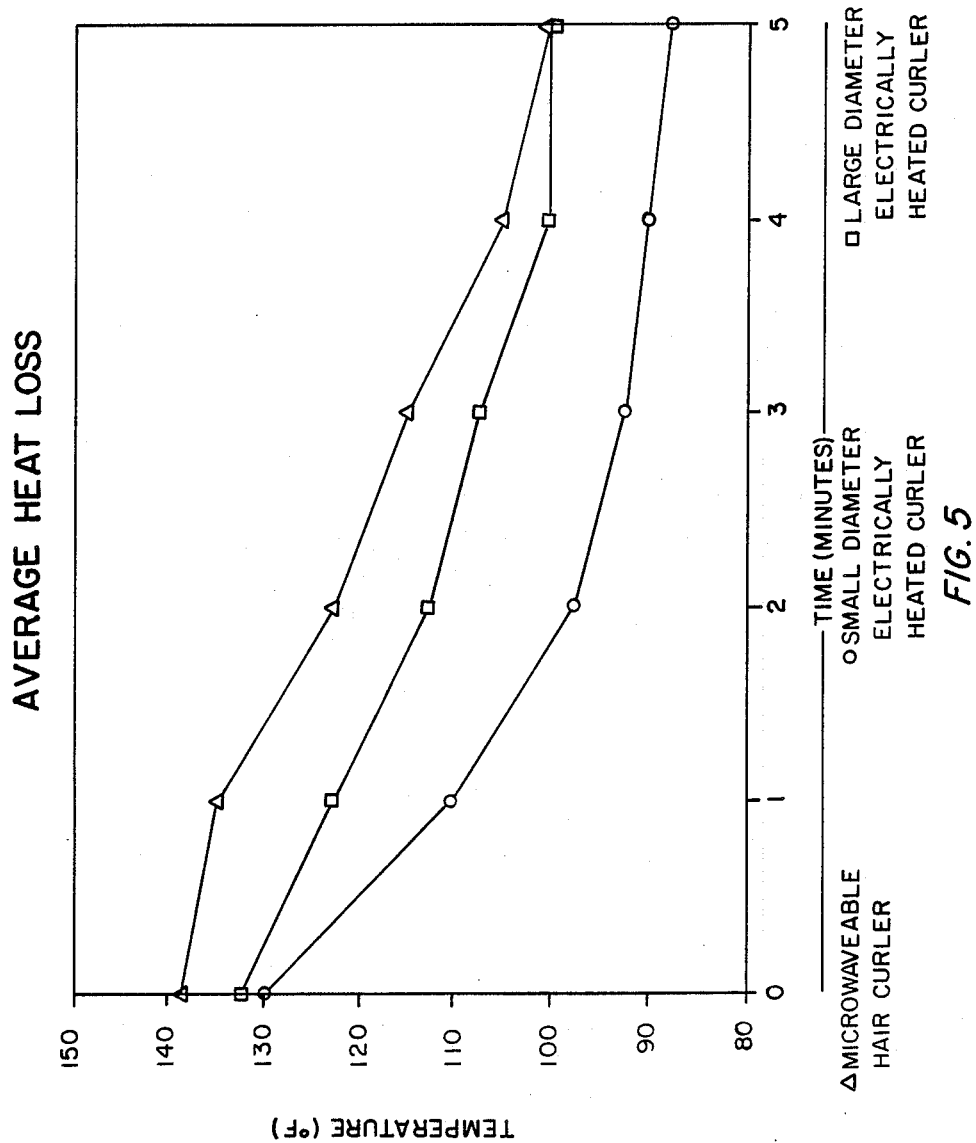

METHOD OF MAKING MICROWAVE-HEATABLE HAIR CURLERS

BACKGROUND OF THE INVENTION

1. Field of the Invention

The present invention relates to devices for drying and curling hair which are rapidly heated in a microwave oven and to a method for producing such devices.

2. Description of the Prior Art

Hair curlers are known for use in drying and curling hair and have been provided in a variety of configurations. Generally, the prior art curlers have comprised molded plastic cylinders or spools which were heated by steam or hot water or which had hollow cores which were fitted around electrically heated rods. The known prior art hair curlers required a lengthy pre-heating time before reaching operating temperatures. In most cases, they required cumbersome heating equipment, such as electrically wired rods, for receiving the hair curler spool.

It is an object of the present invention to provide a hair curler which is rapidly heated to operating temperatures in a microwave oven.

Another object of the invention is to provide a microwaveable hair curler of a flexible material which can be extruded through a die and which can be heated within a desired, useable temperature range within about one to three minutes.

Additional objects, features and advantages will be apparent in the written description which follows.

SUMMARY OF THE INVENTION

In the method of forming a microwave heatable hair curler of the invention, a polyorganosiloxane gum is blended with a particulate, electromagnetic absorptive material to produce a homogeneous, silicone rubber composition which is heatable by exposure to microwave energy. The silicone rubber composition is extruded through a die to produce an extruded body having an elongate configuration. The elongate body is cut into a plurality of curler segments, each of the curler segments having a desired length.

The hair curlers so produced are flexible after curing and can be heated to a desired, usable temperature range of 130°-135° F. in about 1-3 minutes.

BRIEF DESCRIPTION OF THE DRAWINGS

FIG. 5 is a graph of heat loss versus time comparing the curlers of the invention with commercially available hair curlers.

DETAILED DESCRIPTION OF THE INVENTION

Figure 1:
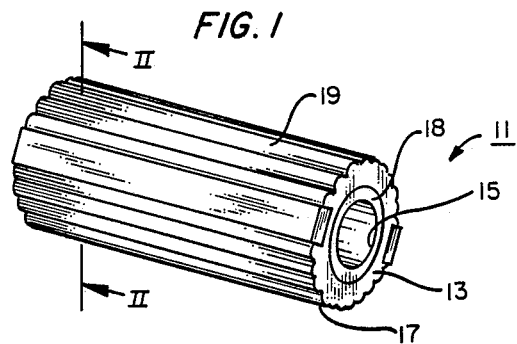
FIG. 1 is a side, perspective view of a cylindrical hair curler made using the method of the invention.

FIG. 1 shows a microwave heatable hair curlers of the invention designated generally as 11. The hair curler 11 includes a flexible, cylindrical curler body 13 having a length and open interior 15 and an exterior 17. The exterior 17 has a plurality of elongate ribs 19 running longitudinally for the length of the body. The ribs 19 give the periphery of the curler 11 a scalloped appearance when viewed from the end, or in the cross-sectional view of FIG. 2.

Figure 2:
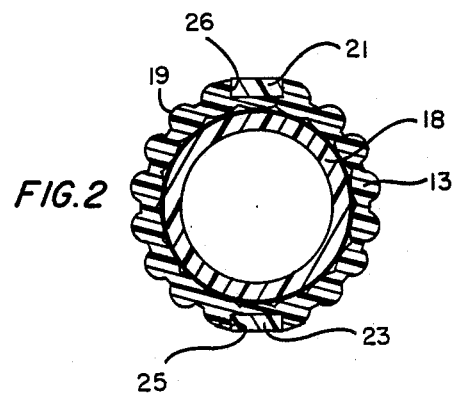
FIG. 2 is a cross-sectional view taken along lines II—II in FIG. 1.

As shown in FIGS. 1 and 2, the body 13 can be provided with an elongate handling strip 21 which is exposed on the exterior 17 of the curler 11. As shown in FIG. 2, a pair of handling strips 21, 23 are preferably provided at 180° circumferential locations, the strips 21, 23 being located within channels 25, 26 provided on the exterior of the curler body. The handling strips 21, 23 are comprised of a dielectric material which is not heatable by exposure to microwave energy. For instance, the strips 21, 23 can be any of a number of extrudable polyolefins, or commercially available silicone rubber compositions. The curler 11 can also have a cylindrical stiffener 18 located within the interior of the curler body. The stiffener 18 can be, for instance, a co-extruded dielectric material such as a commercially available silicone rubber.

Figure 3:
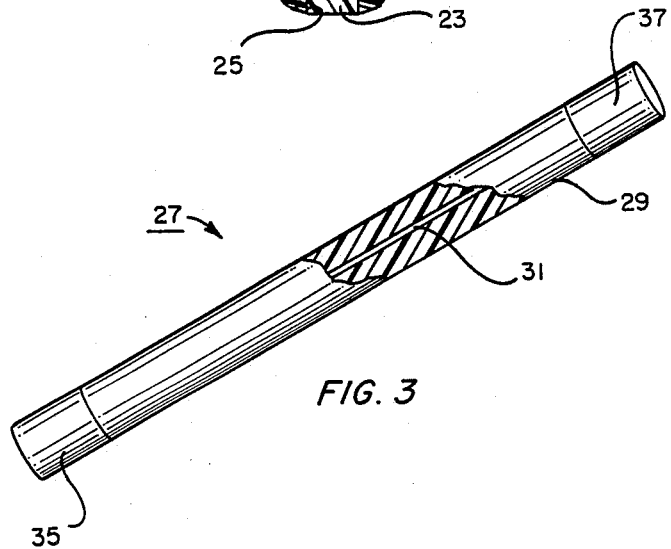
FIG. 3 is a rod-shaped hair curler formed using the method of the invention.

FIG. 3 shows another embodiment of the extruded hair curler of the invention. The curler 27 shown in FIG. 3 is an elongate body which has been extruded through a die in the shape of a solid rod 29. The rod 29 contains a reinforcing member such as rigid wire 31 within the interior thereof. End caps 35, 37 are provided of a dielectric material which is not heatable by exposure to microwave energy to facilitate handling.

Co-extrusion techniques are known in the art. Extrusion of elastomers of dissimilar physical properties or colors requires the use of a co-extrusion head attachment which brings the flow of elastomers together within the extrusion head by flow control sleeves inside the head. The materials meet near the die opening that shapes the part. The product is then vulcanized in conventional manner.

Extrusion over a wire requires the use of a crosshead attachment on the extruder. The die is mounted on the crosshead at right angles to the barrel of the extruder. The wire, handled in bulk form, comes off a pay off system through a straightener device with the help of a puller. The wire is then fed into the flow of material through a hollow die guide or tip oriented to the location required for the part. A variety of cure systems can then be used to cure or vulcanize the extrudiate.

The hair curlers of the invention or manufactured by blending together a polyorganosiloxane gum with a particulate electromagnetic absorptive material to produce a homogeneous, silicone rubber composition which is heatable by exposure microwave energy.

The organopolysiloxane polymers or gums employed in the practice of the present invention are well known materials and can be made by standard methods known in the art. The preferred polymer is an organopolysiloxane gum which contains methyl, vinyl, phenyl and/or 3,3,3-trifluropropyl radicals attached to the silicone atoms of the polymeric siloxane. Examples of organopolysiloxane gums are those polymers, copolymers and mixtures thereof wherein the siloxy units can be dimethylsiloxane, phenylmethylsiloxane, 3,3,3-trifluoropropylmethyl siloxane, diphenylsiloxane, methylvinylsiloxane, and phenylvinylsiloxane. A discussion of the preparation of such compounds can be found, for example, in: Eaborn, D., "Organo Silicone Compounds", Academic Press, New York, 1959; Montermoso J. C., "Silicone Rubbers", Morton, E. D., "Introduction to Rubber Technology", Reinhold Publishing Corp., New York, 1959; Rochow, E. G., "An Introduction to the Chemistry of Silicones", to Ed. John Wiley and Sons, New York, 1951.

The organopolysiloxane polymer used in the method of the invention is most preferably a dimethylvinylsiloxyended polydiorganosiloxane having a percentage of all organic radicals in the gum, 99.80 percent by weight methyl radicals and about 0.2 percent by weight vinyl radicals. A preferred polymer has a specific gravity in the range from about 1.24–1.29 and a durometer of about 40–55.

In order to provide a polymer which is microwave heatable, a particulate, electromagnetic absorptive material is blended with the organopolysiloxane gum. A number of such materials are commercially available, including ferrites, powdered iron, powdered aluminum, and zinc oxide. The preferred absorptive material is zinc oxide and when blended in the range from about 5 to 30 parts per 100 parts polyorganosioxane gum produces a silicone rubber blend which is heatable in the range of 130°–135° F. by exposure to a 700 watt microwave oven for 1 to 3 minutes.

The polyorganosiloxane gum can contain any of the conventional filler materials. These filler materials are well known in the art and are commercially available from a number of sources. The preferred material is a silica filler, sometimes referred to an reinforcing filler, or a mixture of silica filler and an extending filler. Examples of silica filler which can be utilized to reinforce the organopolysiloxane elastomer are fumed silica, precipitated silica, silica aerogel, etc. The filler material, including reinforcing and non-reinforcing fillers, is preferably used in the range of about 10–260 parts of filler per 100 parts of organopolyorganosiloxane gum or elastomer, most preferably in the range of about 20 to 80 parts of filler.

Various curing agents can be employed to effect the more rapid conversion of the polyorganosiloxane compositions to the cured, solid elastic state. For example, benzoyl peroxide, bis(2,4-dichlorobenzoyl)peroxide, and the like. These curing agents are normally present in the polyorganosiloxane composition in an amount ranging from about 0.1 to high as 4 to 8 parts or more based on 100 parts of organpolysiloxane blend.

In addition to the above described ingredients, the silicone rubber compositions of the invention can contain heat stability additives, compression set additives, additives to improve handling properties, dyes or coloring additives and other additives conventionally used in heat cured silicone elastomers and also room temperature cure elastomers.

In the method of the invention, the silicone rubber composition is made by blending or milling together the various constituents. The order of adding the elastomer, filler, curing agent, and electromagnetic absorptive material is not critical. The following example is intended to be illustrative of the invention:

| | |
|---|---|
| Polyorganosiloxane Gum | 60.0 |
| Zinc Oxide* | 15.0 |
| Fume Silica | 23.0 |
| Structure Control Fluid | 2.0 |
| Pigment (Blue) | 0.6 |
| Benzoyl Peroxide Catalyst | 0.6 |

*Nodular, pure grade zinc oxide having a high surface area (7 sq.m/gm.).

Approximately 100 ft. of the above compound was then extruded through a 0.500 inch O.D. die with a 0.065 I.D. pin to produce a curler body having a generally cylindrical configuration as shown in FIG. 1. The extrusion belt speed was set at 28 ft. per minute to obtain a good partial cure of the polymer. The extruded body was then cut into 2.5" lengths and the curler segments so produced were post cured at 400° F. for one hour.

Figure 4:
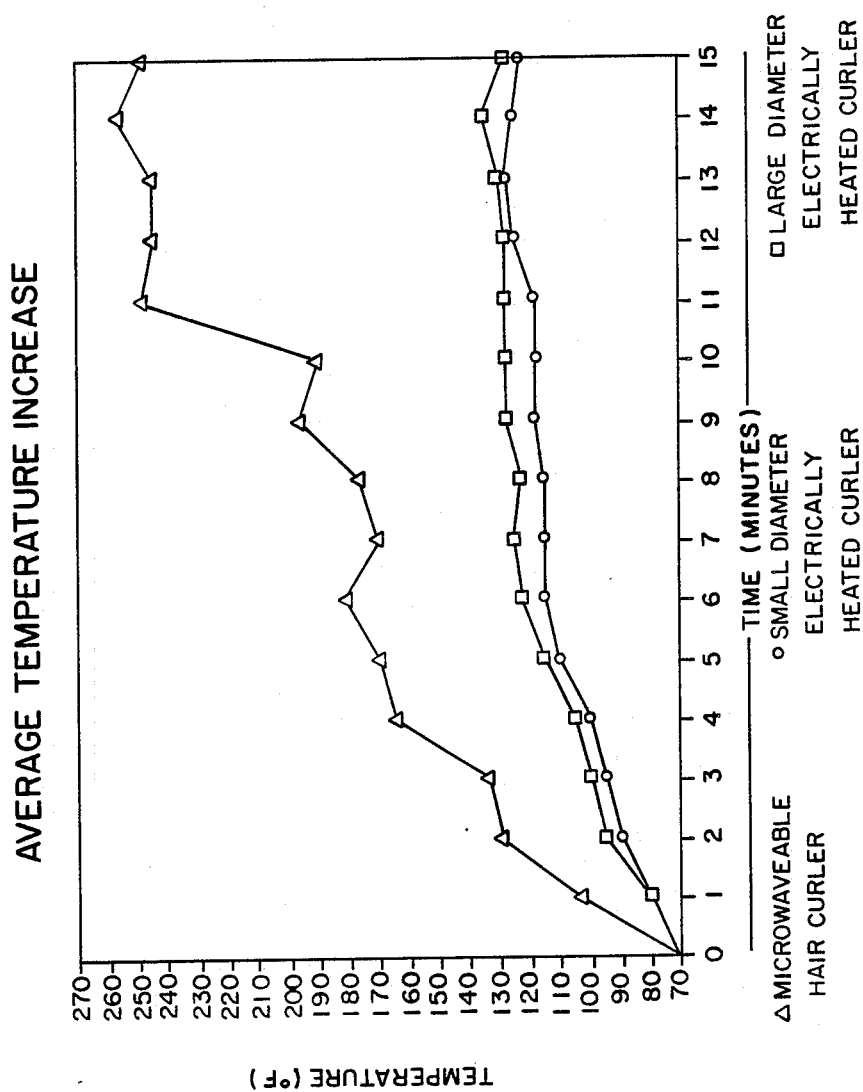
FIG. 4 is a graph of average temperature increase versus time comparing the curlers of the invention to commercially available hair curlers.

FIG. 4 illustrates the average temperature increase of the curlers of the invention as they are heated in a 700 watt microwave oven at 100% power for 0–15 minutes. Temperature at X=0 is room temperature, 72° F.

As shown in FIG. 4, the microwavable hair curlers of the invention reach the desired, useful temperature range of 125°–135° F. in 2–3 minutes. FIG. 4 also shows a comparison with commercially available electrically heated curlers. The comparison curlers were heated in a specially designed heat pack according to the manufacturers directions. The "small" curlers were $7\frac{1}{4}$" long and had an I.D. of 0.64" and an O.D. of 0.4200". The "large" curlers were $7\frac{1}{4}$" long and had an I.D. of 0.64" and an O.D. of 0.5625".

The microwavable hair curlers of the invention reached the desired useful temperature range of 125°–135° F. in 2–3 minutes. In this same time interval, the comparison curlers were 25°–35° F. below the desired, useful range of 125°–135° F.

FIG. 5 illustrates the average heat loss of the microwavable hair curler of the invention as compared to the commercially available, electrically heated curlers. The graph depicts the average heat loss of two sets of four rollers each. The microwavable rollers were heated for two minutes at 100% power. The average temperature was then taken of the rollers every ten seconds for the first two minutes and at one minute intervals for the next three minutes. The average temperature of both sets of rollers was then plotted at one minute intervals. As shown in FIG. 5, the curlers of the invention cool at an acceptable rate as compared to the commercially available, electrically heated curlers.

An invention has been provided with several advantages. The hair curlers of the invention can be rapidly heated to operating temperature in a standard microwave oven such as is found in the home. The curlers retain their operating temperature for a time period comparable to that of commercially available, electrically heated curlers. The hair curlers can be manufactured by a simple extrusion process utilizing an inexpensive die. The silicone rubber composition used in the manufacturing process does not degrade rapidly with time or upon exposure to sunlight, heat or chemicals.

While the invention has been shown in only two of its forms, it is not thus limited but is susceptible to various changes and modifications without departing from the spirit thereof.

I claim:

1. A method of forming a microwave heatable hair curler, comprising the steps of:
    blending a polyorganosiloxane gum with a particulate, electromagnetic absorptive material to produce a homogeneous, silicone rubber composition which is heatable by exposure to microwave energy;
    extruding said homogeneous, silicone rubber composition through a die to produce an extruded body having an elongate configuration;
    cutting the elongate body into a plurality of curler segments, each of said curler segments having a desired length.

2. The method of claim 1, wherein said elongate body is cylindrical with an open interior.

3. The method of claim 1, wherein said elongate body is a solid rod.

4. A method of forming a microwave heatable hair curler, comprising the steps of:
   blending a polyorganosiloxane gum with a particulate, electromagnetic absorptive material, a filler and a peroxide catalyst to produce a homogeneous, silicone rubber composition which is heatable by exposure to microwave energy;
   extruding said homogeneous, silicone rubber composition through a die to produce a cylindrical, flexible body having a length, an open interior and an exterior, said exterior having a plurality of elongate ribs running longitudinally for the length of said body;
   cutting said body into a plurality of curler segments, each of said curler segments having a desired length.

5. The method of claim 4, further comprising the steps of:
   providing at least one channel on the curler exterior;
   co-extruding at least one elongate, handling strip within said channel provided on said curler exterior, said co-extruded, handling strip being comprised of a dielectric material.

6. The method of claim 5, wherein a pair of channels are provided at 180 degree circumferential locations about said curler exterior and wherein a pair of elongate, handling strips are co-extruded in said channels.

7. The method of claim 6, further comprising the steps of:
   inserting a cylindrical stiffener within said open interior of said cylindrical, flexible body.

* * * * *